United States Patent [19]

Roley et al.

[11] 4,191,431

[45] Mar. 4, 1980

[54] TRACK-TYPE VEHICLE UNDERCARRIAGE AND LINK ASSEMBLY

[75] Inventors: Robert D. Roley, Peoria; Roy L. Maguire, Edelstein, both of Ill.

[73] Assignee: Caterpillar Tractor Co., Peoria, Ill.

[21] Appl. No.: 842,816

[22] Filed: Oct. 17, 1977

[51] Int. Cl.² ............... B62D 55/10; B62D 55/14; B62D 55/20; B62D 55/30

[52] U.S. Cl. ............................ 305/18; 305/11; 305/12; 305/14; 305/57; 305/58 R

[58] Field of Search ............... 305/18, 58 R, 12, 14, 305/57, 16, 11, 31, 32

[56] References Cited

U.S. PATENT DOCUMENTS

| 359,468 | 3/1887 | Peirce | 305/16 |
|---|---|---|---|
| 1,561,996 | 11/1925 | Perry | 305/18 |
| 2,123,388 | 7/1938 | Viguerie | 267/60 X |
| 2,581,365 | 1/1952 | Darragh | 305/18 X |
| 3,172,707 | 3/1965 | Tucker | 305/18 |
| 3,492,054 | 1/1970 | Boggs et al. | 305/14 X |
| 3,944,297 | 3/1976 | Stedman | 305/57 |

FOREIGN PATENT DOCUMENTS

| 91462 | 4/1958 | Norway | 305/31 |
|---|---|---|---|
| 270465 | 12/1950 | Switzerland | 305/16 |
| 731556 | 6/1955 | United Kingdom | 305/14 |
| 833547 | 4/1960 | United Kingdom | 305/58 |
| 140694 | 2/1961 | U.S.S.R. | 305/12 |

Primary Examiner—David A. Scherbel
Attorney, Agent, or Firm—James R. Bell

[57] ABSTRACT

An undercarriage for track type vehicles including a guide bar. Recoil apparatus is connected to the guide bar. An endless track of track shoes is guided along the guide bar by a plurality of raised flanges on the track extending between parallel support members on the guide bar.

7 Claims, 3 Drawing Figures

TRACK-TYPE VEHICLE UNDERCARRIAGE AND LINK ASSEMBLY

BACKGROUND OF THE INVENTION

1. Field of the Invention

This invention relates generally to wheel substitutes for land vehicles and more specifically to those having plural link connector elements.

2. Description of the Prior Art

Generally, track shoes for track-type vehicles are linked together by a common pin which engages overlapping links mounted on adjacent shoes. A bushing is rotatably mounted on each pin for engagement by a sprocket assembly to drive the vehicle. Carrier rollers, track rollers and an idler engage a rail surface on the link for guiding and supporting the moving track. Eventually, the rail surfaces become excessively worn due to repeated, noisy, intermittent contact with the rollers and idler. It would be of benefit to provide substantially continuous supportive and guiding engagement with the undercarriage to reduce wear and noise factors generally associated with such undercarriages.

SUMMARY OF THE INVENTION

The present invention is directed to overcoming one or more of the problems as set forth above.

According to the present invention this is accomplished by providing an undercarriage including a guide bar. Recoil apparatus is connected to the guide bar. An endless track of track shoes is guided along the guide bar by a plurality of raised flanges on the track extending between parallel support members on the guide bar.

The foregoing and other advantages and novel features will become apparent from the following detailed description of the invention when considered in conjunction with the accompanying drawings. It is to be expressly understood, however, that the drawings are not intended as a definition of the invention but are for the purpose of illustration only.

DESCRIPTION OF THE PREFERRED EMBODIMENT

Figure 1:
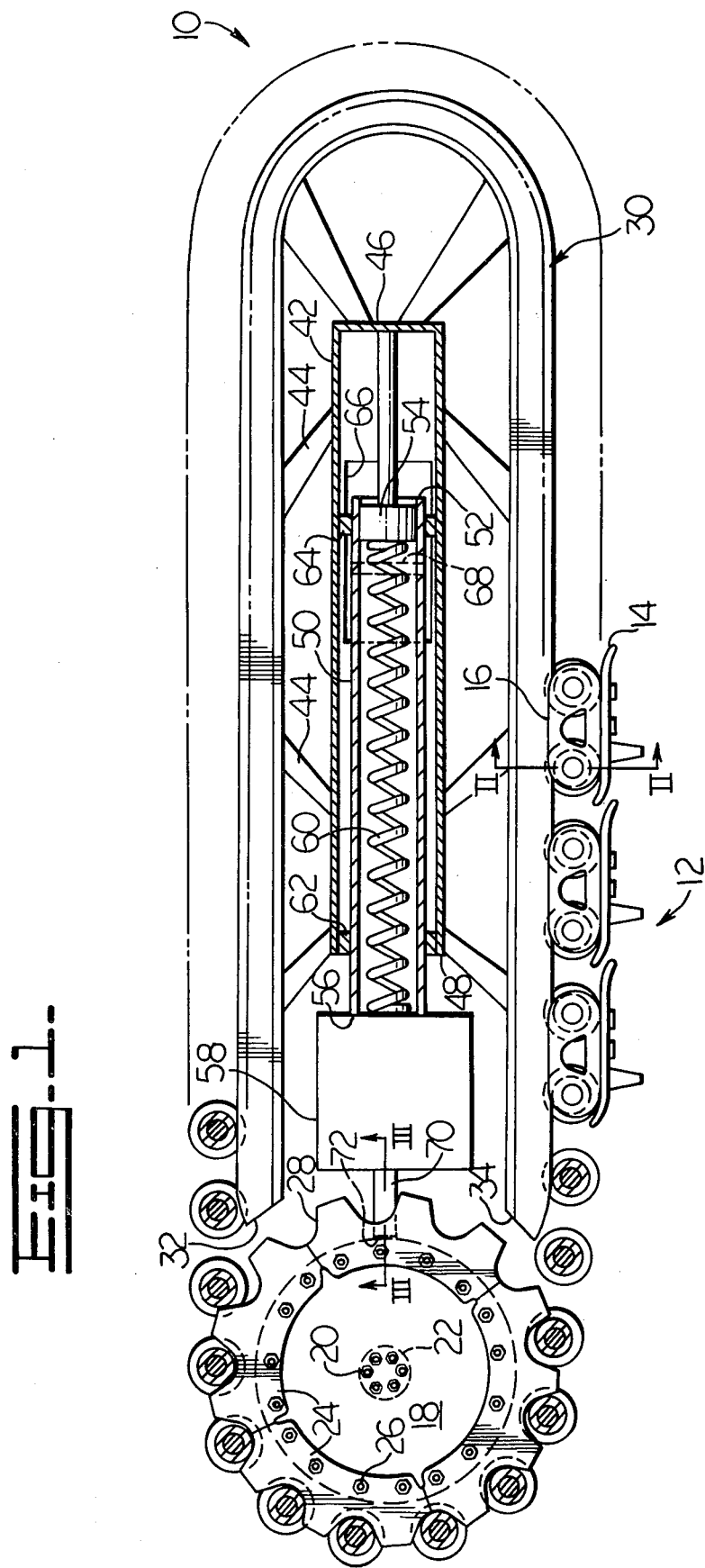
FIG. 1 illustrates a partial side elevation of the track vehicle undercarriage assembly of this invention.

In the drawings, FIG. 1 illustrates the undercarriage of this invention generally designated 10. The undercarriage includes an endless track 12 comprising transversely disposed track shoes 14 articulately linked together in side-by-side relationship by hinges or links 16. A sprocket rim 18 is generally bolted at 20 to an axle 22 which is suitably mounted to the main frame of the associated tractor (not shown). Sprocket segments 24 are bolted to opposite sides of rim 18 by bolts 26, or the like, to form corresponding mating sprockets 28,29 mounted on and spaced by rim 18, see FIG. 3.

Figure 2:
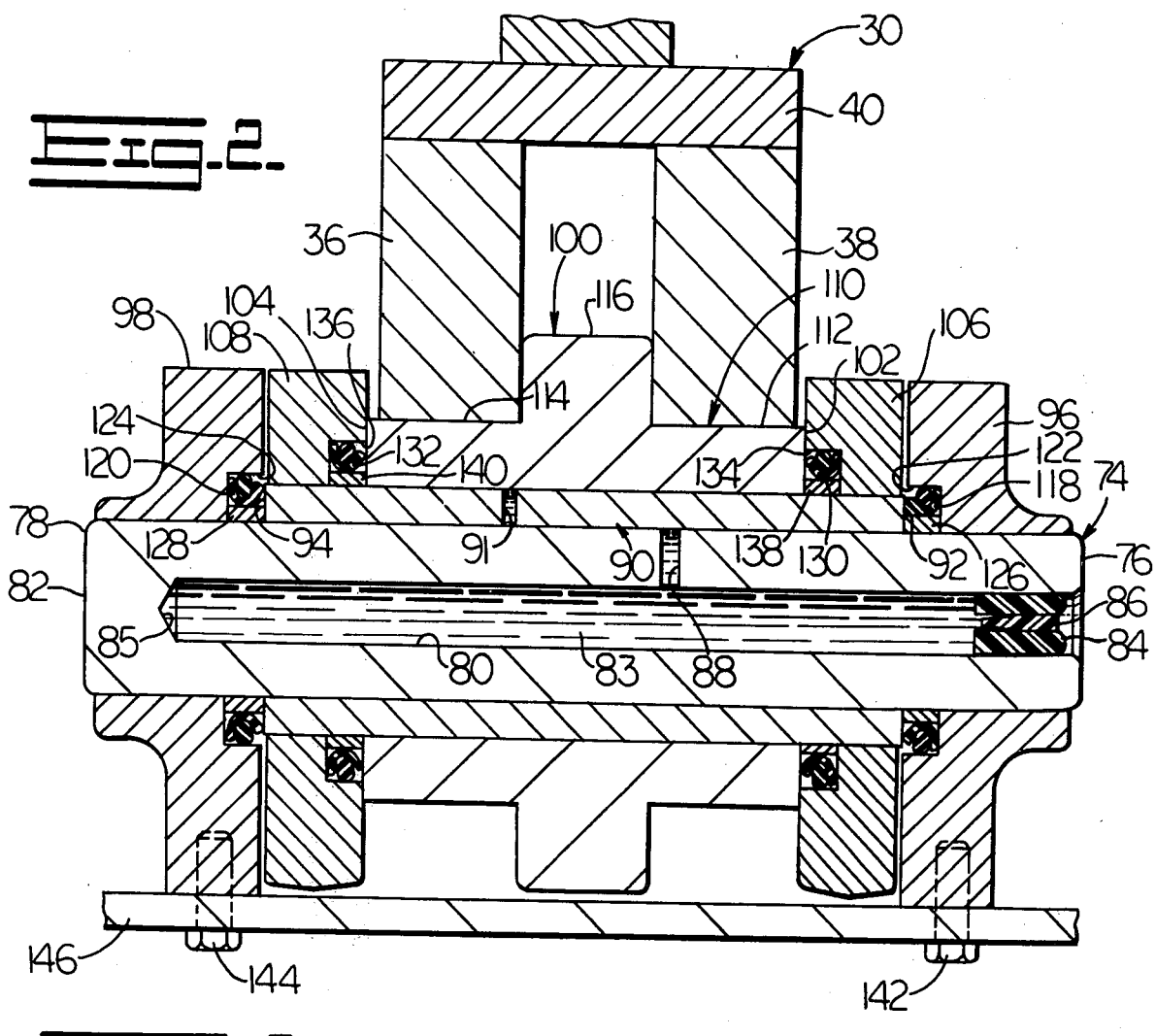
FIG. 2 illustrates a cross-sectional view of the link assembly of this invention taken along line 2—2 of FIG. 1.

An elongated guide bar 30, FIGS. 1 and 2, of a generally "U" shaped configuration is substantially continuous and terminates at first end 32 and second end 34. Bar 30 is bifurcated and includes substantially parallel guiding and supporting members 36,38 maintained in spaced relationship by interconnecting bar member 40. Each of the members 36,38,40 are preferably of a suitable steel and are formed to the desired "U" shape then welded together as a unit.

Bar 30, FIG. 1, is connected to tubular mounting member 42 by a plurality of struts 44. Member 42 is closed at first end 46 and open at second end 48. Recoil receiver member 50 is generally tubular and concentrically disposed within member 42. First end 52 of receiver 50 is open to receive recoil plunger or piston 54 connected to mounting member 42. Second end 56 of receiver 50 is connected to a support member 58 rigidly connected to the main frame of the vehicle. Recoil spring 60 is housed for compression within receiver 50 between piston 54 and receiver second end 56. A plurality of annular guides 62,64 support and concentrically guide relative movement between mounting member 42 and receiver 50. A slot 66 formed in mounting member 42 permits support arm 68 to interconnect receiver 50 and the main frame. In this manner, bar 30, struts 44 and mounting member 42 move as a unit with respect to receiver 50 to absorb recoil of the track. Slot 66 is of a sufficient length to permit relative movement between receiver 50 and mounting member 42 without interference with support arm 68.

Figure 3:
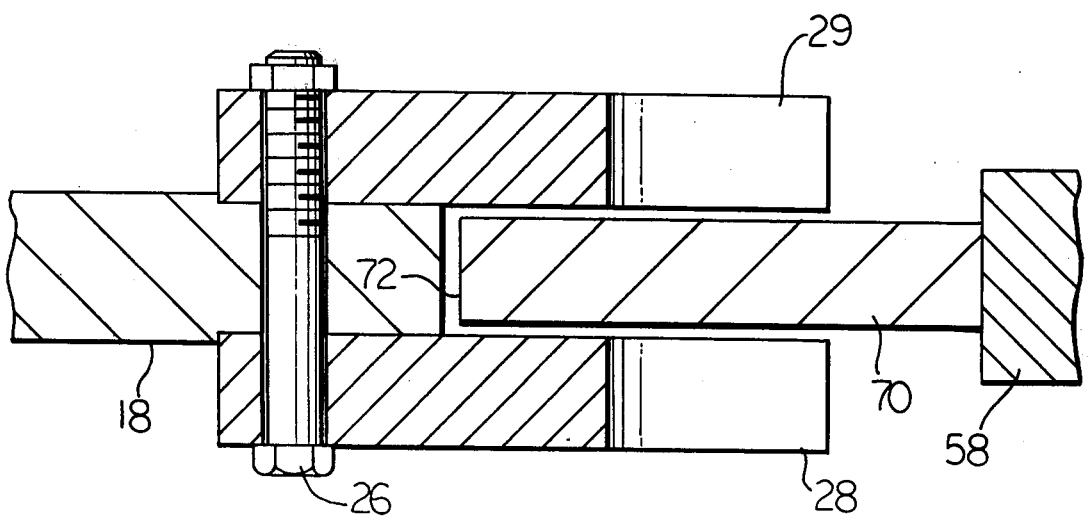
FIG. 3 illustrates a cross-sectional view of the cleaning probe of this invention taken along the line 3—3 of FIG. 2.

Cleaning probe 70, FIGS. 1 and 3, is fixedly attached to and extends from support member 58 radially toward rim 18. Probe 70 terminates adjacent rim 18 at free end 72 between mating sprockets 28,29. Thus, debris lodged between sprockets 28,29 can be removed as the sprockets move past probe 70 extended therebetween.

The link assembly of FIG. 2 includes an elongated pin 74 having opposite ends 76,78. First end 76 includes an axial bore 80 extending therethrough and terminating adjacent second end 82 at seat 85. Lubricating material 83 such as a suitable fluid is carried by pin 74 in bore 80. Resilient seal 84 seals the bore and plug 86 expands seal 84 into substantially tight sealing engagement with bore 80. Passage 88, carried by pin 74 communicates lubricating material from bore 80 to a relatively moving adjacent first annular bushing 90.

First bushing 90 is rotatably mounted on pin 74 and includes first end 92 and opposed second end 94. First link 96 is fixedly connected, as by a press fit, to first end 76 of pin 74. Second link 98 is similarly fixedly connected to second end 82. Links 96,98 are spaced apart by first bushing 90. Passage 91, carried by bushing 90, further communicates lubricating material from bore 80 to a relatively moving second bushing 100. First and second links 96,98 are secured by bolts 142,144 to shoe 146, as is well known. Third and fourth links 106,108 are similarly secured to an adjacent shoe (not shown).

Second annular bushing 100 is rotatably mounted on first bushing 90 and includes first end 102 and opposed second end 104. Third link 106 is fixedly connected, as by a press fit, to first end 92 of bushing 90 and fourth link 108 is similarly connected to second end 94. Links 106,108 are spaced apart by second bushing 100. Outer annular surface 110 of bushing 100 includes first annular land 112 adjacent first end 102 and second annular land 114 adjacent second end 104. A raised annular flange 116 is formed on outer surface 110 and is substantially equally spaced between ends 102,104.

A first pair of annular resilient seals 118,120 are mounted in annular grooves 122,124 formed in links 96,98, respectively. Seal 118 limits leakage of the lubricating material at first end 92 of bushing 90. Seal 120 similarly limits leakage of the lubricating material at the second end 94 of bushing 90. Annular thrust ring 126 is provided in groove 122 to avoid over compression of seal 118 due to lateral movement of first bushing 90. Similarly, annular thrust ring 128 is provided in groove 124 to avoid over compression of seal 120 due to such lateral movement.

A second pair of annular resilient seals 130,132 are mounted in annular grooves 134,136 formed in links 106,108, respectively. The seals limit leakage of the lubricating material at the opposed ends 102,104 of second bushing 100. Also, annular thrust rings 138,140 are provided in grooves 134,136 to avoid over compression of seals 130,132 due to lateral movement of second bushing 100.

Operation

With the above-mentioned parts assembled as described, it can be seen that mating sprockets engage spaced annular lands 112,114 to drive the track-type vehicle. Also, the spaced lands are continuously supported and guided by spaced parallel guide members 36,38 of bar 30 when the track is out of driving contact with the sprockets. Thus, all wear contact is assumed by flanged bushing 100 rather than by rail surfaces provided on the links. Also, raised flange 116 assumes side loads imposed by the spaced sprocket teeth and the spaced guide bars. Cleaning probe 70 extends between the spaced mating sprockets 28,29 for removing debris lodged therebetween as the sprockets rotate relative to the probe.

The foregoing has described a substantially continuous supportive and guiding surface for an endless track as used on track-type vehicles providing the advantages of reduced wear and noise generally associated with track-type vehicle undercarriages.

The embodiments of the invention in which an exclusive property or privilege is claimed are defined as follows:

1. A vehicle undercarriage comprising:
   a guide bar, said guide bar being substantially "U" shaped and having parallel support members;
   a tubular member connected to the guide bar;
   a recoil receiving member movably mounted in the tubular member;
   a recoil piston having a first end connected to the tubular member and having a second end movably mounted in the recoil receiving member;
   means for biasing the recoil piston and its associated tubular member and guide bar relative to the recoil receiving member;
   an endless track of linked together track shoes; and
   means for guiding the track along the guide bar, said means being a plurality of raised flanges on the track extending between the parallel support members of the guide bar.

2. A vehicle undercarriage comprising:
   a guide bar, said guide bar being substantially "U" shaped and having parallel support members;
   a tubular member connected to the guide bar;
   a recoil receiving member movably mounted in the tubular member;
   a recoil piston having a first end connected to the tubular member and having a second end movably mounted in the recoil receiving member;
   means for biasing the recoil piston and its associated tubular member and guide bar relative to the recoil receiving member;
   a sprocket;
   an endless track of linked together track shoes mounted on the guide bar and sprocket;
   each track shoe linked together by an elongated pin having opposite ends;
   a first annular bushing rotatably mounted on the pin and having opposite ends;
   first and second links connected to the opposite ends of the pin and spaced apart by the first bushing;
   a second annular bushing rotatably mounted on the first bushing and having opposite ends;
   third and fourth links connected to the opposite ends of the first bushing and spaced apart by the second bushing; and
   a raised annular flange on the second bushing substantially equally spaced between the opposite ends, the flange extending between the support members of the guide bar.

3. The vehicle undercarriage of claim 2, further comprising:
   lubricating material carried by the pin.

4. The vehicle undercarriage of claim 3, further comprising:
   means carried by the pin for communicating the lubricating material to the first bushing.

5. The vehicle undercarriage of claim 4, further comprising:
   means carried by the first bushing for communicating the lubricating material to the second bushing.

6. The vehicle undercarriage of claim 2, further comprising:
   a first pair of resilient seal means for sealing the opposite ends of the first bushing between the first and second links.

7. The vehicle undercarriage of claim 6, further comprising:
   a second pair of resilient seal means for sealing the opposite ends of the second bushing between the third and fourth links.

* * * * *